Dec. 5, 1939.  R. B. MONTGOMERY  2,182,031
AX HANDLE
Filed Jan. 3, 1939
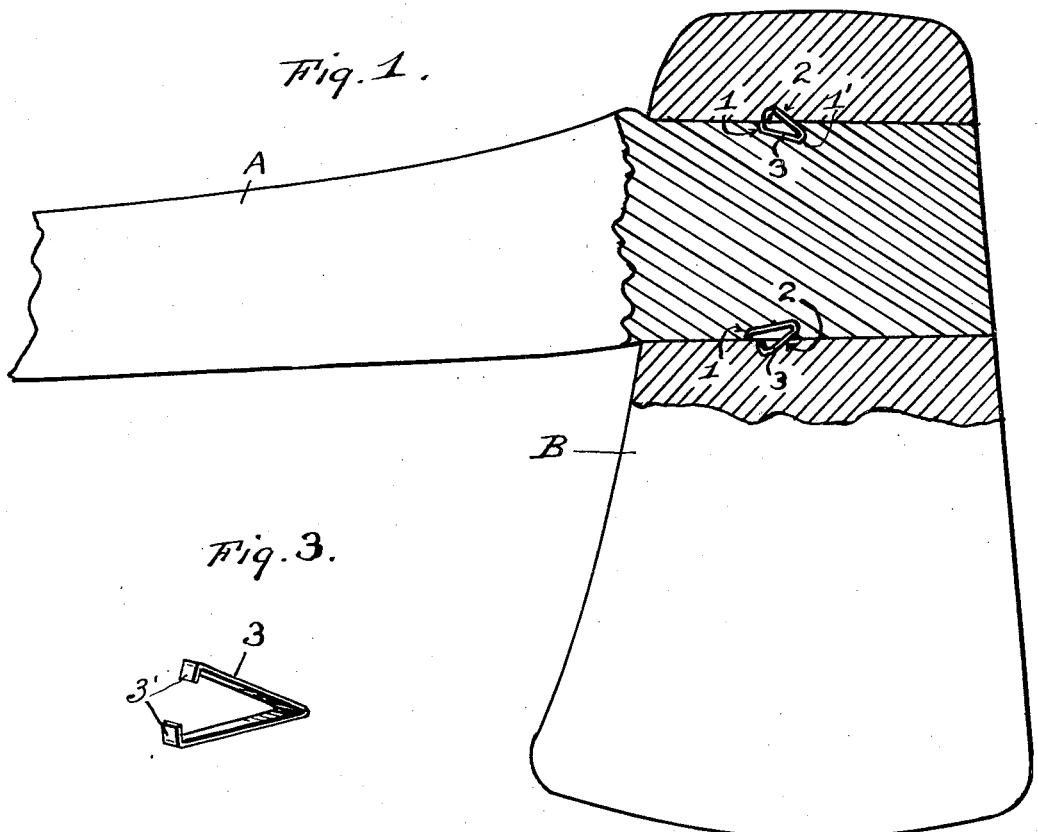
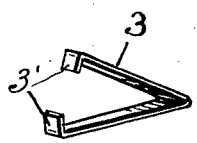
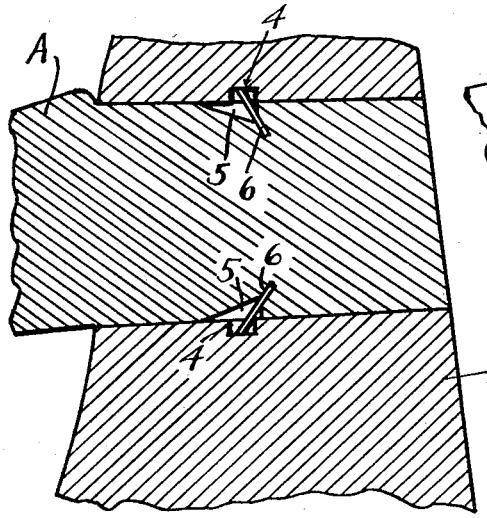
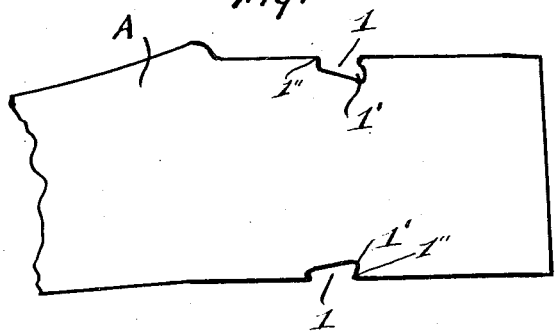
Inventor
R. B. Montgomery
By L. B. James
Attorney Patented Dec. 5, 1939

2,182,031

UNITED STATES PATENT OFFICE 2,182,031

AX HANDLE

Randolph B. Montgomery, Pasadena, Calif.

Application January 3, 1939, Serial No. 249,110

2 Claims. (Cl. 306—33)

This invention relates to means for preventing an ax head from flying off the handle, the general object of the invention being to provide spring means engaging parts of the handle and springing into recesses in the head when the handle is placed in the eye of the head, whereby the head is firmly held on the handle and there is no danger of the head flying off the handle when the ax is in use.

The invention also consists in certain other features of construction, combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Fig. 1 is a sectional view showing one form of the invention.

Fig. 2 is an elevation of the head end of the handle.

Fig. 3 is a view of the wedge.

Fig. 4 is a sectional view showing another form of the invention.

In these views, the handle is indicated at A and the head at B and in carrying out the invention, a recess 1 is formed in each edge of the head end of the handle, each recess being formed with a deep end 1' at that end which is closest to the free end of this part of the handle. A recess 2 is also formed in each edge wall of the eye of the head, the recess having a straight longitudinally extending wall and a sloping wall with the straight wall located closest to the inner end of the eye. A spring metal wedge 3 is adapted to fit in each pair of recesses and each wedge is of substantially V shape with free ends of its arms turned inwardly to form tongues 3'. The apex of each wedge extends towards the outer end of the eye to fit into the deep undercut end of the recess in which it is mounted and these wedges will conform to the shape of the recesses when in position, and be firmly held in the recesses of the handle by abutting engagement of the tongues 3' at ends of the inner arms with the shoulders 1" at rear ends of the recesses as shown in Fig. 1.

The wedges are placed in the recesses of the handle where they are firmly held by wedging fit and then when the end of the handle is forced into the eye of the head, the outer limbs or arms of the wedges will be pressed in to the recesses of the handle and then when they come opposite the recesses 2 of the head they will spring outwardly into the recesses of the head with their tongues in abutting engagement with shoulders at rear ends of the recesses 2 and thus lock the head to the handle, as shown in Fig. 1.

In the modification shown in Fig. 4 the recesses 4 of the head are of substantially rectangular shape while those 5 in the handle are of substantially V shape but with the outer wall substantially straight. A straight spring strip 6 is located in each recess 5 with one end extending into the wood of the handle and the other end projecting from the recess. These strips are arranged at an inclination and are located adjacent the straight walls of the recesses 5 so that when the handle is forced into the eye of the head, the strips will bend into the recesses 5 and then when they come opposite the recesses 4 they will spring into the same and thus the head is held to the handle.

It is thought from the foregoing description that the advantages and novel features of the invention will be readily apparent.

It is to be understood that changes may be made in the construction, combination and arrangement of the several parts, provided such changes fall within the scope of the appended claims.

What I claim and desire to protect by Letters Patent is:

1. A tool having a handle and a head formed with an eye for receiving the forward portion of said handle, walls of the eye and the said end portion of said handle having recesses registering when the handle is engaged through the eye, said recesses each having a shoulder at its rear end and the recess of the handle increasing in depth forwardly and having a deep undercut front end, and a V-shaped resilient securing member mounted in the recess of said handle with its arms extending rearwardly and terminating in tongues extending towards each other, the forward portion of said securing member being engaged in the undercut forward portion of the recess in the handle, the inner arm of said securing member having its tongue in confronting and abutting engagement with the shoulder at rear end of the recess in the handle, and the outer arm of the securing member being engaged in the recess of the eye of said head with its tongue in confronting and abutting engagement with the shoulder at the rear end of the recess in the head.

2. A tool having a handle and a head provided with an eye for receiving the front end portion of the handle, the said end portion of said handle and walls of the eye of said head having registering recesses therein, and a V-shaped spring member having an inner arm seated in the recess of the handle and an outer arm extending rearwardly out of the recess of the handle for engaging in the recess of the head when the handle is forced into the eye of the head and firmly holding the head upon the handle.

RANDOLPH B. MONTGOMERY.